United States Patent [19]

Adamson

[11] 4,121,741
[45] Oct. 24, 1978

[54] LIQUID DISPENSER WITH MAGNETICALLY OPERABLE VALVE

[76] Inventor: Jane E. Adamson, 3238 W. Parade Cir., Colorado Springs, Colo. 80917

[21] Appl. No.: 817,568

[22] Filed: Jul. 21, 1977

[51] Int. Cl.² ............................................. B67D 3/00
[52] U.S. Cl. ................................... 222/181; 222/505; 251/65
[58] Field of Search ............... 222/181, 185, 505, 504; 251/65

[56] References Cited

U.S. PATENT DOCUMENTS

| 1,932,384 | 10/1933 | Alton | 222/181 |
| 2,658,648 | 11/1953 | Tribbitt | 222/181 X |
| 3,609,425 | 9/1971 | Sheridan | 251/65 X |
| 3,802,606 | 4/1974 | Gust | 222/181 |

FOREIGN PATENT DOCUMENTS

| 1,298,519 | 6/1962 | France | 251/65 |
| 1,192,424 | 5/1970 | United Kingdom | 251/65 |

*Primary Examiner*—Joseph J. Rolla
*Attorney, Agent, or Firm*—W. Britton Moore

[57] ABSTRACT

A liquid dispenser embodying a plastic canister with a fill inlet at one end and an outlet spout at the other end insertable within a cylindrical plastic valve body formed with a bracket thereon for removable wall mounting. A decorated plastic cover is removably attached to the front of and conceals the canister when wall mounted. The valve body includes a metal ball valve and a finger operable valve actuator pivoted in the valve body and provided with a magnet at its inner lower end for pivotal movement into engagement with the valve body to attract and move the ball valve relative to the outlet spout opening so that the contents may be dispensed therethrough.

10 Claims, 6 Drawing Figures

LIQUID DISPENSER WITH MAGNETICALLY OPERABLE VALVE

This invention relates to a wall mounted liquid dispenser having a valve assembly for receiving and supporting the discharge spout thereof and including a metal ball valve and a finger operable actuator with a magnet thereon for moving the ball valve relative to the outlet opening.

While various dispensers with magnetically controlled valves have been proposed, such as those of U.S. Pat. to Kuckens, No. 3,258,166, Sherwood, No. 3,476,355, Gust, No. 3,802,606, and Loe, No. 3,731,670, none of these devices embody simple and easily actuable valve mechanisms for readily wall mounting the dispensers and including ball valves arranged in the valve mechanisms and associated with the outlet spouts thereof and having pivoted valve actuators with magnets thereon whereby finger actuation thereof displaces the ball valve and permits controlled discharge of the contents.

The principal object of the present invention is to provide a liquid dispenser embodying a plastic canister with an outlet spout at its lower end received within and vertically supported by a cylindrical plastic valve body having a metal ball valve arranged on a tapered valve seat, and wherein a valve actuator is pivoted in the valve body with a finger engaging surface at its outer end and a magnet at its inner end whereby actuation of the magnet attracts and dislodges the ball valve and permits controlled discharge of the contents.

Another object is the provision of a plastic wall mounted liquid dispenser supported by a finger actuated magnetic controlled metal ball valve, and wherein a decorated plastic cover is removably attached to and over the dispenser for concealing the latter.

Still another object is the provision of a plastic wall mounted liquid dispenser mountable within and supported by a cylindrical plastic valve body including a ball valve and a pivoted magnet valve actuator, and wherein the dispenser may be removed therefrom to permit of the cleaning of both the dispenser and the valve assembly.

A further object is to provide a novel valve assembly for supporting and controlling discharge from a plastic dispenser, and including a tapered valve seat with a metal ball therein and a magnetic disc pivoted in a side wall cavity of the assembly and tiltable into engagement with the body thereof by a finger actuated actuator pivoted to the cover.

A still further object is the provision of a plastic wall mounted liquid dispenser with a magnetically actuable ball valve assembly for controlling discharge through the spout thereof, and wherein a plastic cover is removably attached to the dispenser and has a finger actuable actuator pivoted thereto and movable into engagement with the magnet for dislodging the ball valve from its seat and permitting discharge of the contents.

Another object is to provide a generally U-shaped decorated plastic cover having side lugs thereon interfittable with recesses on the sides of the dispenser so as to permit removable assembly of the cover thereon.

Still another object is the provision of a novel cylindrical valve assembly having a bracket attached thereto for ready removable assembly relative to a mating wall bracket whereby the dispenser may be mounted on and removed from the wall.

These and other objects and advantages will be apparent as the following specification is considered with the accompanying drawings, wherein FIG. 1 is a perspective view of the dispenser and cover assembly wall mounted, with the upper portion of the cover partly broken away;

Figure 1:
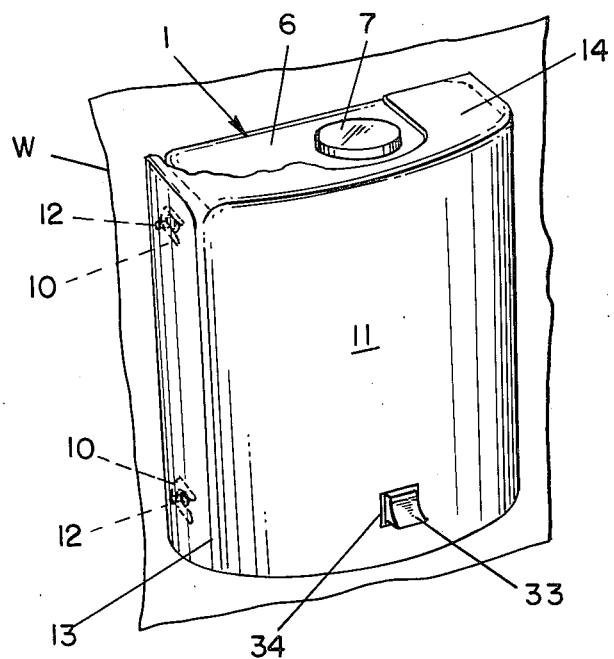
Figure 2:
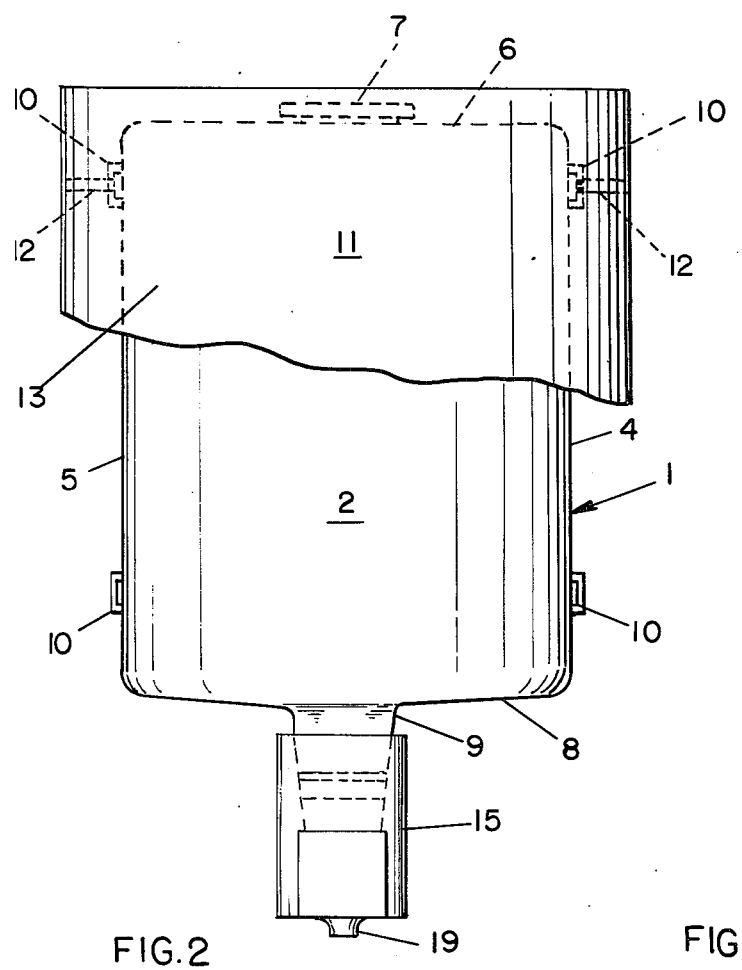
FIG. 2 is a front view of the dispenser and cover, with the latter broken away to disclose the valve assembly.

Referring more particularly to the drawings, wherein similar reference characters designate like parts throughout the several views, numeral 1 generally shows a substantially rectangular dispensing canister of plastic or other suitable material and having a flat front and rear faces 2 and 3, sides 4 and 5, a closed top 6 having a suitable removable filling stopper 7, and wherein the lower end 8 terminates in a downwardly depending, centrally arranged, tapered, exteriorly threaded, discharge spout 9.

Formed at the upper and lower ends of each of the sides 4–5 are tracks or keyways 10 within which are slidably received lugs 12 formed on the inside of a generally convex semi-cylindrical cover 11 which is inserted over the front of the canister. The cover is open at its rear and has a curved front face 13 and a top flange 14 which flatly engage the wall surface W when assembled on and serves to house and conceal the canister. It is to be understood that the cover may be colored or otherwise suitably decorated to adapt to the decor of the user.

Figure 3:
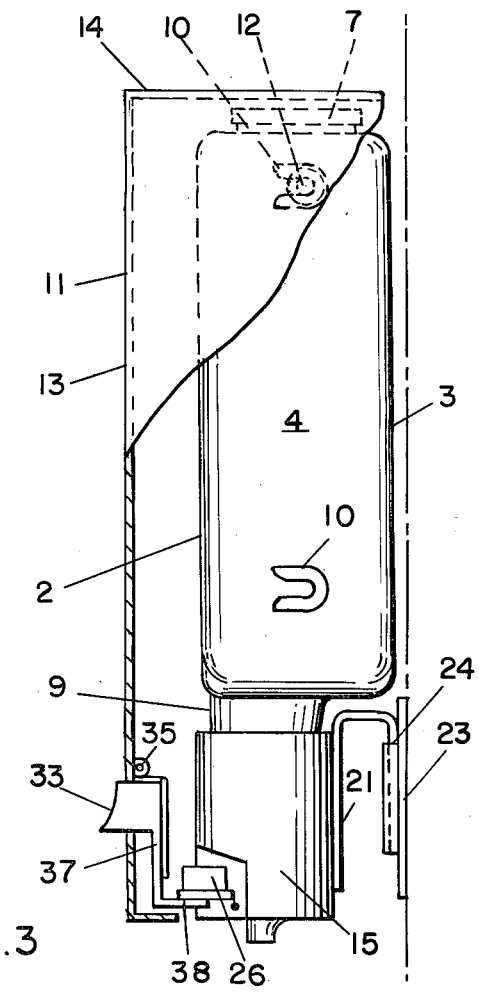
FIG. 3 is a side view of the device of FIG. 2, with the cover partly in section.
Figure 4:
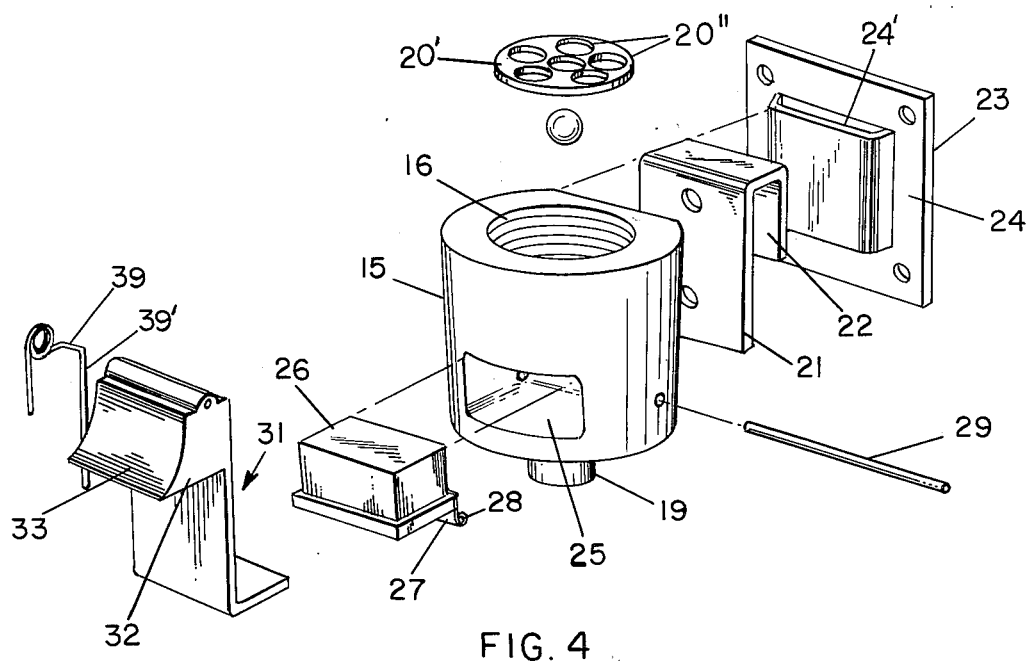
FIG. 4 is an exploded view of the ball valve assembly, and the magnetic disc and finger actuated actuator associated therewith.

A cylindrical plastic valve body 15 is formed with an interiorly threaded, tapered, annular valve chamber 16 in its upper end having an inwardly and downwardly flared valve seat 17 with an O ring 17' or other suitable seal at its lower end. Extending centrally from seat 17 is a reduced elongated bore 18 which terminates in an outlet nipple 19 for the discharge of the canister contents. A metal ball valve 20 is arranged on seat 17 and normally rests centrally thereof over and closes the upper end of bore 18, and is adapted, when magnetically attracted, as presently to be described, to roll upwardly and laterally over the flared seat 17 to open and permit flow through bore 18 and nipple 19. A circular ball retainer plate 20' having a plurality of spaced apertures 20" extending therethrough, is suitably spacedly supported in the valve chamber 16 above ball valve 20 and serves to retain the latter therein. Suitably attached to valve body 15 is a vertically disposed inverted U-shaped bracket 21 having its spaced shortened and flat rear arm 22 slidably and removably sleeved within a pocket 24' formed in the flat front face 24 of bracket 23, in turn suitably secured to wall surface W, as best shown in FIGS. 3 and 4.

The lower end of valve body 15 is recessed, as at 25, to accommodate therein a substantially rectangular magnetic disc 26, with the disc having a downturned flange 27 at the rear edge of its base, which flange is journalled at 28 to receive a pivot pin 29, spanning and mounted in the walls of recess 25. The upper end 30 of the recess is tapered upwardly to enable the disc 26 to flatly engage therewith when pivoted and tilted upwardly thereagainst.

A generally L-shaped disc actuating lever 31 is formed with an enlarged upper end 32 having a flared finger engaging outer face 33, so that the upper end may be arranged within and project outwardly through an opening 34, adjacent the lower end of cover 11. The upper end 32 is pivoted, as at 36, to interior lugs 35 on cover 11, and the lever 31 is provided with a depending leg 37 turned inwardly at 38 so that the magnetic disc 26 may rest and be supported thereon, as in FIG. 5, and, when the upper end 32 is depressed by finger pressure, lever 31 will pivot upwardly and lift or tilt disc 26 into engagement with the tapered upper end 30 of valve body recess 25, as in FIG. 6, for a purpose hereinafter to be apparent. A wire spring 39 (FIG. 4) may be attached to a lug 35 so that a depending leg 39' thereof will bear downwardly against the rear face of lever 31 and apply spring pressure thereagainst.

Figures 5, 6:
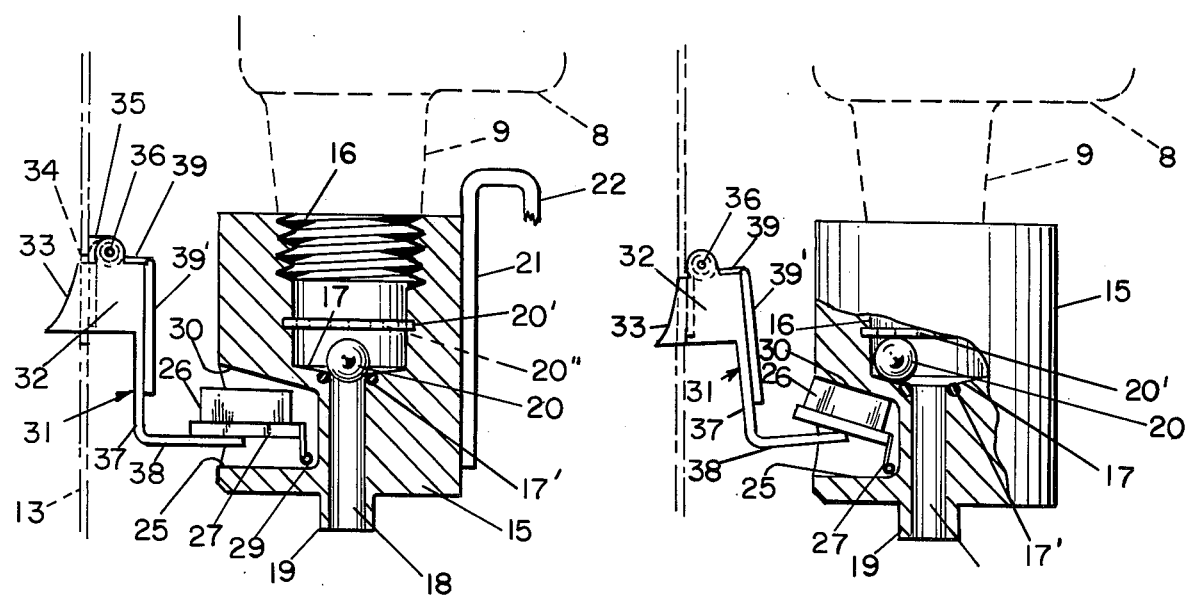
FIG. 5 is a section through the cylindrical valve body, showing the ball valve in closed, and the magnet and actuator in inactive positions.
FIG. 6 is a section through the cylindrical valve body, showing the ball valve dislodged in open, and the magnet and actuator in active positions.

With the bracket 21 attached to bracket 23 and wall mounted, and valve body 15 supported thereon, the spout 9 of canister 1 may be threadedly arranged in valve chamber 16 thereof and thus vertically supported thereby. When the cover 11, with lever 31 pivotally connected thereto, is attached to the canister, the end 38 of lever 31 will underlie and retain the base of magnetic disc 26 in the generally horizontal position of FIG. 5. When it is desired to discharge contents from the canister, the flared outer face 33 at the upper end of lever 31 is depressed, as previously described, and the magnetic disc 26 is tilted upwardly and inwardly into engagement with tapered valve body recess face 30 whereby metal ball valve 20 will be magnetically attracted thereby and caused to be displaced from its valve seat, as shown in FIG. 6, so that the contents will be discharged through bore 18 and nipple 19, in an obvious manner. Upon release of finger pressure from lever 31, spring 39 will return the lever to its initial inactive position and thereby drop the magnetic disc 26 and cause the ball valve 20 to roll back to the closed position of FIG. 5.

While a preferred embodiment of the liquid dispenser and magnetically operable valve thereof has been shown and described, it is to be understood that various changes and improvements may be made therein without departing from the scope and spirit of the appended claims.

What I claim is:

1. In a dispenser, a canister having a lower discharge spout, a cylindrical valve body including a valve chamber therein for vertically receiving said spout, a reduced discharge bore extending below said chamber, a valve seat at the upper end of said discharge bore, a metal ball valve and attaching means for coupling the valve body to said canister, a recess in said valve body with a magnetic disc pivotally arranged therein, a cover for enclosing said canister and valve body, a lever pivoted to said cover and having finger engaging means thereon at its upper end, an inturned lower end on said lever underlying said disc, whereby when said lever is depressed and pivoted said disc will be tilted upwardly into engagement with said valve body to magnetically attract and displace said ball from its seat and discharge canister contents therethrough.

2. In a dispenser according to claim 1, wherein said valve seat is flared, and magnetic attraction from said disc displaces said ball valve and causes it to roll upwardly of said seat to permit discharge therethrough.

3. In a dispenser according to claim 1, wherein said valve body recess has a tapered upper wall, and said magnetic disc is tilted upwardly into engagement with said tapered wall whereby said metal ball valve is magnetically attracted and displaced relative to said valve seat.

4. In a dispenser according to claim 1, wherein said discharge spout is exteriorly threaded, and said valve chamber is interiorly threaded for threaded interengagement.

5. In a dispenser according to claim 4, wherein said canister, valve chamber, and cover are plastic.

6. In a dispenser according to claim 1, wherein said cover is substantially semi-cylindrical and applied to the front of said canister.

7. In a dispenser according to claim 6, wherein said canister has a keyway on the sides thereof, and said cover has a lug thereon for removable engagement with said keyway to secure said cover thereto.

8. In a dispenser according to claim 7, wherein said cover has an opening therein and an interior lug adjacent said opening, and said lever is pivoted to said lug so as to be disposed and depend from the interior of said cover.

9. In a dispenser according to claim 1, further, including a wall attached bracket and a canister bracket removably engageable therewith attached to said valve body whereby said valve body, canister and cover are supported vertically.

10. In a dispenser according to claim 9, wherein said wall attached bracket is flat and formed with a pocket, and the canister bracket attached to said valve means is generally U-shaped and slidably received in said pocket.

* * * * *